US005603982A

United States Patent [19]

Sun

[11] Patent Number: 5,603,982
[45] Date of Patent: Feb. 18, 1997

[54] THIN FILM SOLID ELECTROLYTE PRODUCTION METHOD

[75] Inventor: Luying Sun, Stoughton, Mass.

[73] Assignee: Battery Engineering, Inc., Hyde Park, Mass.

[21] Appl. No.: 531,198

[22] Filed: Sep. 19, 1995

[51] Int. Cl.$^6$ .................................................. H07M 10/40
[52] U.S. Cl. ..................... 427/121; 427/389.9; 427/421; 429/192
[58] Field of Search ............................ 429/192; 427/121, 427/389.9, 394, 421

[56] References Cited

U.S. PATENT DOCUMENTS

| | | | |
|---|---|---|---|
| 4,781,941 | 11/1988 | Inukai et al. ................. | 427/121 X |
| 4,830,939 | 5/1989 | Lee et al. ..................... | 429/192 |
| 5,001,023 | 3/1991 | Cheshire et al. ............. | 429/192 |
| 5,102,752 | 4/1992 | Hope et al. .................. | 429/192 |
| 5,238,758 | 3/1993 | Lee et al. ..................... | 429/191 |
| 5,240,791 | 8/1993 | Izuti et al. ................... | 429/192 |
| 5,384,213 | 1/1995 | Olsen ........................... | 429/192 |
| 5,455,127 | 10/1995 | Olsen et al. .................. | 429/192 |

*Primary Examiner*—Stephen Kalafut
*Attorney, Agent, or Firm*—Shlesinger, Arkwright & Garvey

[57] ABSTRACT

This invention is concerned with a method for producing thin film solid polymer electrolytes and more particularly to a method for producing solid thin reinforced terpolymer electrolyte films for use in the fabrication of solid state rechargeable batteries and other solid state electrochemical devices such as supercapacitors, fuel cells, sensors and the like.

20 Claims, No Drawings

THIN FILM SOLID ELECTROLYTE PRODUCTION METHOD

A related U.S. application for a patent was filed on Aug. 4, 1995 Ser. No. 08/511,470 entitled Rechargeable Battery polymeric Electrolyte.

BACKGROUND

In the past it has been suggested that solid polymer electrolytes can be successfully produced for use in various forms of electrochemical devices. Certain prior art examples for producing these solid state electrolytes are contained in the patents to Lee et al 4,830,939, May 16, 1989 and 5,238,758, Aug. 24, 1993; and to Olsen 5,384,313 Jan. 24, 1995. In these patented disclosures prepolymers or monomers and prepolymer mixtures with an electrolyte salt have been spread on various surfaces to be polymerized to produce the desired solid polymer electrolyte.

The two Lee et al references teach the art how to produce either a free standing solid polymer electrolyte film or an electrode half element by first producing a radiation curable mixture of a monomeric or prepolymeric radiation polymerizable compound, a radiation inert ionically conducting liquid, and an ionizable alkali metal salt that can be poured into a mold or coated onto a surface previously coated with a release agent. The mixture is then cured. The resulting product is the desired free standing electrolyte film having a film thickness that can vary from about 15 to 100 microns thick. Or in another form the film can be polymerized in situ on a half element by being cured on a metal foil that has been coated with this radiation curable mixture. The coating of the resulting viscous mixture on the metal foil is placed on the foil by any known method such as a rod coating, roll coating, blade coating, extrusion step or other such procedure to lay down a coating that can then be cured on that surface.

Olsen described a similar procedure for making a device with a solid polymer electrolyte for use in an electrochemical device. He teaches the process of producing an electrolyte precursor comprising of a solid matrix-forming monomer and/or partial polymer thereof in a solvent capable of also dissolving an electrolyte salt. This solution is coated onto an electrode to form a layer of from 25 to 120 microns thick. This layer is then covered with a protective sheet to prevent the solvent used in the precursor mix from evaporating, then curing the electrolyte precursor by radiating the mixture on the electrode and then removing the cover. It is stated that the precursor is applied to the electrode by any conventional technique such as by extrusion, blade coating, silk screening or other well known techniques to produce a polymerizable layer having a thickness ranging from between no less than about 25 to as thick as 120 microns. The minimum thickness is specified to be of that thickness in order to ensure that the coating is pinhole free and the ultimate 120 micron thickness is specified because it is said that a greater thickness would increase the thickness of the final electrochemical device and thus decrease the energy density of that device.

In all of these known teachings the starting polymeric mixtures produce a viscous liquid electrolyte precursor adapted to be extruded or blade coated onto a support prior to being polymerized to form the ultimate solid polymer layer. Various additives are suggested for inclusion in the precursor, such as solvents and electrolyte salts, but the basic precursor composition being prepared for laying down the ultimate layer that is to be polymerized to form the ultimate solid polymer electrolyte, is a somewhat viscous solution. Since one or more components of the starting materials mixtures is a polymer or prepolymer which has relatively high molecular weight, the resulting electrolyte precursor is too viscous to spread using an economical and practical method such as spraying. However, due to the high viscosity, equipment such as extruders or blade applicators is necessitated to spread the viscous precursor.

BRIEF DESCRIPTION OF THE INVENTION

A method of making thin film solid polymer electrolytes of from 1 mil to 5 mils thick is provided by this invention. The starting materials for forming a free flowing monomer containing precursor solutions together with an electrolyte salt and a plasticizer are described herein that are adapted to be polymerized to provide the desired thin film solid polymer electrolytes.

To produce the thin film solid polymer electrolyte of this invention, a free flowing liquid polymerizable solution is formulated which basically includes an electrolyte salt dissolved in monomers. This solution is not viscous and is easy to process. The selected monomers all have a relatively low molecular weight of under 300 so that the resulting solution can be simply sprayed or easily cast on to a supporting surface to form a thin layer that can then be polymerized to form a thin film solid polymer electrolyte.

DETAILED DISCLOSURE

The solid polymer electrolytes of this invention result broadly from polymerizing any one of a number of various solution formed from combining selected monomers together with an electrolyte salt and a plasticizer which monomers can be polymerized to produce a crosslinked network with excellent mechanical properties and enhanced ambient temperature conductivity as disclosed in the above mentioned related U.S. application for patent.

In following this invention, a typical example provides a solid polymer electrolyte for a solid state battery by polymerizing a thin layer of a solution containing three selected monomers each of which has a molecular weight of less than 300, and preferably which has a molecular weight of 50 to 290 with an electrolyte salt and a plasticizer. One of the monomers to be selected is a compound having two acryloyl functionalities which serves as a crosslinking agent for example a diacrylate. Another selected monomer is a compound having one acryloyl or allyl functionality and also contains groups with high polarity such as a carbonate or a cyano group. Another of the selected monomers is a compound having one acryloyl functionality and an oligo(oxyethylene) group ($-CH_2CH_2O-$).

Within the solid polymer electrolyte produced upon polymerizing the above described solution, the monomer which includes the cyano or carbonate group serves to enhance the conductivity since either one of these groups provides an appreciable acceptor number which quantifies the possibility for anion solvation thus making the electrolyte salt more conductive. The monomer having the oligo(oxyethylene) side chain provides the resulting polymer with flexibility and free volume for the movement of ions, and also provides the resulting solid polymer electrolyte with compatibility with plasticizers.

The solution formed upon combining these monomers is a free flowing liquid that can easily be sprayed or cast onto a support surface to form a thin layer that can then be polymerized. The polymerization of this solution results in the formation of a thin film homogeneous solid terpolymer electrolyte composition without phase separation since the combination between the polymer and plasticizers as well as the complexation between the polymer and salt will proceed at the molecular level, i.e. "nano complexation".

The free flowing liquid precursor solution described above can be spread in a thin layer, to ultimately be polymerized in the form of a thin film, by being sprayed on the surface of an electrode to be polymerized in situ on that surface of the electrode. Or the precursor solution can be sprayed on a solid substrate to be cured and then removed therefrom. Preferably however this free flowing monomeric solution is sprayed on a suitable reinforcing fabric to then be cured to produce a thin self sustaining solid polymer electrolyte film adapted to be easily manipulated for assembly in any one of a number of various kinds of electrochemical devices.

The free flowing liquid precursor solution of monomers can be sprayed and cured on a reinforcing fabric in a film layer as thin as 1.5 mil thick including the fabric to as much as 5 mils. The thickness of such a reinforced polymer electrolyte film can be controlled by use of a fabric with a desired thickness. A thinner polymer electrolyte film for example $\leq 1$ mil thick may be manufactured by using a fabric which is less than 1 mil thick. When such a film is cured on the reinforcing fabric the resulting reinforced polymer electrolyte film is mechanically strong (see Table 3) and is well adapted to be used in a spirally wound rechargeable battery.

In another situation an electrolyte thin film that has been cured in situ on the surface of an electrode is useful in various types of electrochemical devices. Also, a solution of the precursor can first be cast in a thin film upon a suitable support and then stripped from the support after it has been polymerized. Such a polymerized thin film is very delicate and when removed must be handled with care. This thin non-reinforced but solid polymer film, when properly handled, has been found to be satisfactory for certain limited uses such as in a laboratory set up for example.

A useful terpolymer based solid polymer electrolyte made in accordance with the present teaching was prepared by the in situ polymerization of a solution formed with three selected monomers, a lithium salt and a plasticizer. The monomers were 2-ethoxyethyl acrylate (EA), ethylene glycol ethyl carbonate methacrylate (EGECM), and tri(ethylene glycol) dimethacrylate (TEDM). EA and TEDM were purchased from Aldrich Chemical Company, Milwaukee, Wis., while EGECM was synthesized as described in the related disclosure listed above which is hereby made of reference in this specification.

Example No. 1

A solution of an electrolyte salt and the three above described monomers was prepared as follows: 0.20 g of $LipF_6$ was dissolved in 1.00 g mixture consisting of plasticizers such as ethylene carbonate and propylene carbonate (50/50, w/o). To this solution, was added 0.02 g of benzoyl peroxide polymerization initiator and then to the resulting solution were added 0.10 g of 2-ethoxyethyl acrylate, 0.10 g of ethylene glycol ethyl carbonate methacrylate and 0.03 g of tri(ethylene glycol) dimethacrylate. The final solution was then spread onto stainless steel foil and then heated at a temperature of 85° C. to initiate and to complete the polymerization reaction within 5 minutes. When cooled to room temperature it was found that a delicate, soft and flexible film about 4 mils thick was obtained which could be used when carefully handled for laboratory experimental activities.

Example No. 2

Another example of the use of the above described polymerizable solution was accomplished by spraying onto a 3 cm by 3 cm piece of HOLLEYTEX™ fabric made by Ahlstron Filtration Inc. of Mount Holly Springs, Pa. The fabric was 1.5 mil thick and was supported on a sheet of MYLAR™ Plastic film placed on a solid support. The liquid polymerizable solution described above was sprayed onto the fabric. The electrolyte precursor was covered first with a sheet of said plastic® film, care being taken to exclude air bubbles from the fabric and then a glass plate about 3 mm thick was placed onto the said plastic® as a load to provide pressure. It was then heated at 85° C. for five minutes to produce the solid polymer electrolyte film which was 2 mils thick. After the polymerized fabric-reinforced film has cooled to room temperature, the self standing reinforced solid polymer electrolyte can be peeled off of the said plastic film® support. This product was found to have high mechanical strength.

Examples of solid polymer electrolyte films made as here taught are set forth in Table 1. Samples Nos. 1, 2, 5, and 6 are solid polymer electrolyte films made with the monomers described above in Examples 1 and 2. The samples Nos. 3 and 4 are solid polymer electrolytes made with the same solution described above except with a substitution of acrylonitrile for the ethylene glycol ethyl carbonate methacrylate monomer in a different stoichiometric ratio.

TABLE 1

| Sample No. | Monomer Ratio | Plasticizer Ratio | $LiPF_6$/ monomers/ plasticizers | Wt. % of Fabric as of SPE Film | Conductivity (S cm$^{-1}$) |
| --- | --- | --- | --- | --- | --- |
| 1 | EA/EGECM/TEDM 3.33/3.33/1.00 | EC/PC 1.00/1.00 | 1.00/1.15/5.00 | 0 | $2.6 \times 10^{-3}$ |
| 2 | EA/EGECM/TEDM 3.33/3.33/1.00 | EC/PC 1.00/1.00 | 1.00/1.15/5.00 | 35 | $1.4 \times 10^{-3}$ |
| 3 | EA/AN/TEDM 5.63/1.88/1.00 | EC/PC 1.00/1.00 | 1.00/1.47/6.53 | 0 | $2.5 \times 10^{-3}$ |
| 4 | EA/AN/TEDM 5.63/1.88/1.00 | EC/PC 1.00/1.00 | 1.00/1.47/6.53 | 35 | $1.1 \times 10^{-3}$ |
| 5 | EA/EGECM/TEDM 4.00/2.67/1.00 | EC/EPN 1.00/1.00 | 1.00/1.15/5.00 | 35 | $1.4 \times 10^{-3}$ |
| 6 | EA/EGECM/TEDM 4.00/2.67/1.00 | EC/NMP 2.00/1.00 | 1.00/1.15/5.00 | 8 | $1.9 \times 10^{-3}$ |

In Table 1 the abbreviations are as follows: EA, 2-ethoxyethyl acrylate; EGECM, ethylene glycol ethyl carbonate methacrylate; AN, acrylonitrile; TEDM, tri(ethylene glycol) dimethacrylate; EC, ethylene carbonate; pC, propylene carbonate; EPN, 3-ethoxypropionitrile; NMP, N-methyl-2-pyrrolidinone.

Example No. 3

In another form, this invention can be used for polymerizing a thin solid polymer electrolyte film in situ on a positive electrode element. Such an electrode is produced by hot-pressing a mixture consisting of $LiCoO_2$ (51%), polyacrylonitrile as binder (2.5%), $LiPF_6$ (5%) and ethylene/propylene carbonate plasticizer (36%) onto an aluminum foil in a layer that is 2.22 cm ×3.49 cm. Then a polymerizable solution consisting of 0.35 g of a monomer mixture of 2-ethoxyethyl acrylate, acrylonitrile and tri(ethylene glycol) dimethacrylate in a proportion of 5/1/1 w/o mixed with 0.15 g of $LiPF_6$, 1.05 g of the ethylene carbonate/propylene carbonate plasticizers in a 50/50 w/o and 0.02 g of benzoyl peroxide to initiate the polymerization reaction is cast on the surface of that electrode and heated at 70° C. for polymerization. The solution is polymerized within 4 minutes and a solid film is produced on the electrode surface that is 1 mil thick.

Example No. 4

A number of solid polymer electrolyte films were prepared by in situ polymerization of the monomers described in Example 1 and 2 using various reinforcing materials. The reinforcing fabrics for preparing samples 7 and 8 were woven type fabrics made by precision Fabrics Group Inc. of Greensboro, N.C. Conductivity data was determined and is set forth in Table 2. The woven-fabric reinforced solid polymer electrolytes illustrate lower conductivity than non-woven fabric reinforced electrolytes due to their lower air porosity.

TABLE 2

| Sample No. | Type of Fabric | Air Porosity of Fabric (CFM/ft$^2$) | Conductivity of the Resulting SPE Film (S cm$^{-1}$) |
|---|---|---|---|
| 2 | Non-woven, fabric | 560 | $1.4 \times 10^{-3}$ |
| 7 | Woven, PFG #66118 | 130 | $0.4 \times 10^{-3}$ |
| 8 | Woven, PFG #56111 | 3–6 | $0.3 \times 10^{-3}$ |

Sample Nos. 9, 10, and 11 are fiber reinforced solid polymer electrolyte films made with the electrolyte precursor described in Example 1 and 2 by in situ polymerization technique. The reinforcing materials for preparing samples 9, 10, and 11 were non-woven fabrics made by Ahlstron Filtration Inc. which have a thickness of 1.3, 2.5, and 3.5 mils respectively. Mechanical property data was measured and is set forth in Table 3. The mechanical property of a polypropylene based cell separator which has been used conventionally as cell separator for liquid electrolyte rechargeable batteries is also included for comparison.

TABLE 3

| Sample No. | Thickness of SPE Film (mil) | Mullen Burst Strength (psi) |
|---|---|---|
| 9 | 1.5 | 30 |
| 10 | 3.0 | 45 |
| 11 | 4.0 | 51 |
| Polypropylene based cell separator | 1.0 | 16 |

The reinforced solid polymer electrolyte made as taught herein is well adapted to be used in the assembly of a rechargeable electrochemical cell as described in that copending application, the substance of which is incorporated herein by reference.

The preferred method of producing a thin film solid polymer electrolyte by dissolving an electrolyte salt in a precursor solution of selected monomers and then spraying or otherwise spreading the liquid solution onto a surface of electrode or reinforcing fabric to be polymerized is described above. It is possible that modifications thereof will occur to those skilled in the art that will fall within the scope of the following claims.

I claim:

1. The method of producing a thin film solid polymer electrolyte in the range of from 1 mil to 5 mils thick for use in electrochemical devices comprising forming a liquid precursor solution of consisting of monomers having a molecular weight of less than 300 and an electrolyte salt, spreading said solution in a film having a thickness within said range on a support, and then polymerizing said solution to produce a thin solid polymer electrolyte film.

2. The method of claim 1 wherein said solution includes three monomers.

3. The method of claim 1 wherein said solution includes a plasticizer.

4. The method of claim 1 wherein said solution is spread on an electrode element and then polymerized in situ.

5. The method of claim 1 wherein said solution is spread on a reinforcing fabric carried on said support and is then polymerized in situ on said reinforcing fabric.

6. The method of claim 2 wherein said solution is spread on a reinforcing fabric carried on said support and is then polymerized in situ on said reinforcing fabric.

7. The method of claim 5 wherein said fabric is a non-woven fabric material and said solution is filled into the open spaces of the material forming said fabric-reinforced polymer electrolyte film.

8. The method of claim 6 wherein said solution is spread on said fabric by being sprayed thereon.

9. The method of claim 7 wherein said solution is spread-on said fabric by being sprayed onto said non-woven fabric.

10. The method of claim 7 wherein after said solution is polymerized on said fabric the completed thin film solid polymer electrolyte film is removed from said support.

11. The method of making a thin film solid polymer electrolyte comprising providing a liquid precursor solution including a liquid based consisting of monomers having a molecular weight of less than 300 and including an electrolyte salt, spreading the liquid solution on a support in a film in a thickness range of from 1 mil to as much as 5 mils and then polymerizing the solution.

12. The method of claim 11 wherein the solution is spread on a reinforcing material and the material is encapsulated in the solid polymer electrolyte when the solution is polymerized.

13. The method of claim 12 wherein the reinforcing material is a non-woven fabric.

14. The method of claim 11 wherein said liquid solution includes three monomers.

15. The method of claim 14 wherein said solution is spread on a non-woven reinforcing fabric to be polymerized on said fabric.

16. The method of claim 15 wherein said solution is sprayed onto said non-woven reinforcing fabric to be polymerized on said fabric.

17. The method of claim 14 wherein one of said monomers is a compound having two acryloyl functionalities, another of said monomers is a compound having one acryloyl functionality and a carbonate group, and another of said monomers is a compound having one acryloyl functionality and an oligo(oxyethylene) group.

18. The method of claim 14 wherein one of said monomers is a compound having one allyl functionality and also contains groups selected from a group that contains high polarity consisting of a carbonate group and a cyano group, and another of said monomers is a compound having one acryloyl functionality and an oligo(oxyethlene) group.

19. The method of claim 1 wherein one of said monomers is a compound having two acryloyl functionalities, another of said monomers is a compound having one acryloyl functionality and a carbonate group, and another of said monomers is a compound having one acryloyl and an oligo(oxyethylene) group.

20. The method of claim 1 wherein one of said monomers is a compound having one allyl functionality and also contains groups selected from a group that contains high polarity consisting of a carbonate group and a cyano group, and another of said monomers is a compound having one acryloyl functionality and an oligo(oxyethylene) group.

* * * * *